(12) United States Patent
Baxter et al.

(10) Patent No.: US 11,634,789 B2
(45) Date of Patent: Apr. 25, 2023

(54) SELECTIVE LITHIUM EXTRACTION FROM BRINES

(71) Applicant: InCoR Lithium, Nicosia (CY)

(72) Inventors: Ken Baxter, Bull Creek (AU); David Dreisinger, Delta (CA); Hiroki Fukuda, Vancouver (CA)

(73) Assignee: InCoR Lithium, Nicosia (CY)

( * ) Notice: Subject to any disclaimer, the term of this patent is extended or adjusted under 35 U.S.C. 154(b) by 283 days.

(21) Appl. No.: 17/021,453

(22) Filed: Sep. 15, 2020

(65) Prior Publication Data

US 2021/0079497 A1 Mar. 18, 2021

Related U.S. Application Data

(60) Provisional application No. 62/901,008, filed on Sep. 16, 2019.

(51) Int. Cl.
 *C22B 26/00* (2006.01)
 *C22B 26/12* (2006.01)
 *C01D 15/08* (2006.01)
 *C22B 3/42* (2006.01)
 *C22B 3/44* (2006.01)

(52) U.S. Cl.
 CPC .............. *C22B 26/12* (2013.01); *C01D 15/08* (2013.01); *C22B 3/42* (2013.01); *C22B 3/44* (2013.01)

(58) Field of Classification Search
 CPC ........... C01D 15/08; C22B 26/12; C22B 3/24; C22B 3/42; C22B 3/44; C01P 2006/80
 See application file for complete search history.

(56) References Cited

U.S. PATENT DOCUMENTS

| | | |
|---|---|---|
| 4,124,684 A | 11/1978 | Olivier et al. |
| 4,723,962 A | 2/1988 | Mehta |
| 5,219,550 A | 6/1993 | Brown et al. |
| 5,910,382 A | 6/1999 | Goodenough et al. |
| 5,993,759 A | 11/1999 | Wilkomirsky |
| 6,048,507 A | 4/2000 | Amouzegar et al. |
| 6,143,260 A | 11/2000 | Boryta |
| 6,514,640 B1 | 2/2003 | Armand et al. |
| 6,547,836 B1 | 4/2003 | Lukes |
| 8,617,430 B2 | 12/2013 | Chiang et al. |
| 8,641,992 B2 | 2/2014 | Galli et al. |
| 8,679,428 B2 | 3/2014 | Kim et al. |
| 8,685,566 B2 | 4/2014 | Schougaard et al. |
| 8,691,169 B2 | 4/2014 | Perez et al. |
| 8,795,614 B2 | 8/2014 | Chon et al. |
| 8,920,763 B2 | 12/2014 | Tanimura et al. |
| 9,169,125 B2 | 10/2015 | Kang et al. |
| 9,255,011 B2 | 2/2016 | Kawata et al. |
| 9,255,012 B2 | 2/2016 | Tiihonen et al. |
| 9,362,562 B2 | 6/2016 | Armand et al. |
| 9,484,574 B2 | 11/2016 | Bodoardo et al. |
| 9,598,291 B2 | 3/2017 | Chon et al. |
| 9,725,787 B2 | 8/2017 | Laitala et al. |
| 9,994,930 B2 | 6/2018 | Ehren et al. |
| 10,246,341 B2 | 4/2019 | Yang et al. |
| 10,315,926 B2 | 6/2019 | Nakano et al. |
| 10,336,624 B2 | 7/2019 | Song |
| 2003/0157013 A1 | 8/2003 | Olsson |
| 2007/0160516 A1 | 7/2007 | Boryta et al. |
| 2009/0286159 A1 | 11/2009 | Nuspl et al. |
| 2011/0305624 A1 | 12/2011 | Sadan et al. |
| 2012/0308896 A1 | 12/2012 | Asari |
| 2013/0186760 A1 | 7/2013 | Zhao et al. |
| 2018/0170763 A1 | 6/2018 | Byun et al. |

FOREIGN PATENT DOCUMENTS

| | | |
|---|---|---|
| CN | 102049237 A | 5/2011 |
| EP | 2749535 A1 | 7/2014 |
| EP | 2855735 B1 | 3/2018 |
| WO | 2010105508 A1 | 9/2010 |
| WO | 2010131664 A1 | 11/2010 |
| WO | 2011082444 A1 | 7/2011 |
| WO | 2011133165 A1 | 10/2011 |
| WO | 2012099637 A1 | 7/2012 |
| WO | 2013049952 A1 | 4/2013 |
| WO | 2014078908 A1 | 5/2014 |
| WO | 2014161865 A1 | 10/2014 |
| WO | 2014161866 A1 | 10/2014 |
| WO | 2014161867 A1 | 10/2014 |
| WO | 2014161868 A1 | 10/2014 |
| WO | 2014202005 A1 | 12/2014 |
| WO | 2015035488 A1 | 3/2015 |
| WO | 2015096549 A1 | 7/2015 |
| WO | 2015121684 A1 | 8/2015 |
| WO | 2016182337 A1 | 11/2016 |

(Continued)

OTHER PUBLICATIONS

International Search Report & Written Opinion for PCT/IB2020/058580, dated Dec. 10, 2020, 12 pages.

(Continued)

*Primary Examiner* — Steven J Bos (74) *Attorney, Agent, or Firm* — Mintz, Levin, Cohn, Ferris, Glovsky and Popeo, P.C.

(57) ABSTRACT

Processes are provided for the selective recovery of lithium from brines using aqueous redox reactions, involving lithium extraction into a particulate ferric phosphate solid in the form of an iron (III) heterosite, in the presence of a reducing agent capable of reducing ionic lithium, at a controlled lithium extraction pH. Lithium elution involves exposing the loaded lithium ferrous phosphate solids, in the form of lithium iron (II) triphylite, to an oxidizing agent capable of mediating the oxidation of the sequestered atomic lithium. This is carried out at a controlled acidic lithium elution pH. Conditions in the lithium extraction and elution steps are provided so that a concentrated liquid lithium eluate is provided to subsequent steps of impurity removal and lithium carbonate precipitation.

26 Claims, 8 Drawing Sheets

(56) References Cited

FOREIGN PATENT DOCUMENTS

| WO | 2017005113 A1 | 1/2017 |
|----|---------------|--------|
| WO | 2017028162 A1 | 2/2017 |
| WO | 2018085915 A1 | 5/2018 |
| WO | 2018157203 A1 | 9/2018 |
| WO | 2018234614 A1 | 12/2018 |
| WO | 2019002653 A1 | 1/2019 |

OTHER PUBLICATIONS

Evans R. Keith (Mar. 2008) "An Abundance of Lithium", CiteSeer, Available at: http://citeseerx.ist.psu.edu/viewdoc/summary?doi=10.1.1.363.1242, 17 pages.

Fukuda Hiroki (Jul. 2019) "Lithium Extraction from Brine with Ion Exchange Resin and Ferric Phosphate", The University of British Columbia, 171 pages.

Malik et al. (May 8, 2013) "A Critical Review of the Li Insertion Mechanisms in LiFePO4 Electrodes", Journal of the Electrochemical Society, 160(5):A3179-A3197.

Meshram et al. (Dec. 2014) "Extraction of Lithium from Primary and Secondary Sources by Pre-treatment, Leaching and Separation: A Comprehensive Review", Hydrometallurgy, 150:62 pages.

Munk et al. (2016) "Lithium Brines: A Global Perspective: Chapter 14", Reviews in Economic Geology, 18:339-365.

Padhi et al. (May 1996) "LiFePO4: A Novel Cathode Material for Rechargeable Batteries", Electrochemical Society Meeting Abstracts, 96-1, 73 pages.

Padhi et al. (Apr. 1997) "Phospho-olivines as Positive-Electrode Materials for Rechargeable Lithium Batteries", Journal of The Electrochemical Society, 144(4):1188-1194.

Yamada et al. (Apr. 16, 2006) "Room-temperature Miscibility Gap in LixFePO4", Nature Materials, 5(5):357-360.

Zhang et al. (Jul. 18, 2019) "Systematic Review of Lithium Extraction from Salt-lake Brines Via Precipitation Approaches", Minerals Engineering, 139:105868.

SELECTIVE LITHIUM EXTRACTION FROM BRINES

CROSS-REFERENCES TO RELATED APPLICATIONS

This application claims the benefit of priority to U.S. Patent Application No. 62/901,008, filed on Sep. 16, 2019, which is incorporated in its entirety for all purpose.

FIELD

The disclosed innovations are in the field of hydrometallurgy, including selective recovery of lithium from Na—K—Mg—Ca—B—Cl—$SO_4$ brines using aqueous redox reactions.

BACKGROUND

A very wide variety of processes have been described for the recovery of lithium from the limited natural sources in which it occurs in reasonable abundance, including the production of lithium carbonate from concentrated lithium brines (see References 1-45). Increasing industrial demand for lithium dictates that there remains a need for improved processes that are capable of selective and thorough recovery of dissolved lithium from complex saline brines.

SUMMARY

Processes are provided for extraction of lithium from a brine, such as a continental brine, for example comprising, in addition to $Li^+$, $Na^+$, $K^+$, $Mg^{2+}$, $Ca^{2+}$, $Cl^-$, $SO_4^{2-}$ and a boron salt. Processes may begin with steps of clarifying and heating the brine. Clarifying may be carried out so as to remove suspended solids below a threshold, for example less than 100 ppm or less than 10 ppm. Heating may for example be up to a temperature of up to about 65° C. Heating up to this point improves subsequent steps of lithium extraction, but beyond this point heating may in some embodiments be deleterious, for example facilitating insertion of Na into the adsorbent.

Lithium extraction may involve exposing the heated clarified brine to a particulate ferric phosphate solid, for example sized on the order of <100 micron, or <10 micron or <5 micron. The ferric phosphate solid may be in the form of an iron (III) heterosite ($Fe^{3+}PO_4$), and may include an amount of carbon that facilitates conductivity. The exposure of the brine to the ferric phosphate solid takes place in the presence of a reducing agent capable of mediating the incorporation of lithium into the iron phosphate media, with the addition of an acid or a base at a controlled lithium extraction pH, for example of from 4 to 10, or at about pH 7. Lithium is thereby extracted from the heated clarified brine by reductive topotactic insertion of lithium ions into the reduced particulate ferric phosphate, to form a loaded lithium ferrous phosphate solid.

A lithium-extraction solid/liquid separation may then be used to separate the loaded lithium ferrous phosphate solid from a hot spent brine. In some embodiments, a portion of the hot spent brine may be recycled to a heat exchanger for heating the incoming brine. Optionally, the lithium ferrous phosphate solids may be washed before further processing.

Lithium elution involves exposing the lithium ferrous phosphate solids (in the form of $LiFePO_4$, lithium iron (II) phosphate, $LiFe^{2+}PO_4$, triphylite) to an oxidizing agent capable of mediating the oxidation of the sequestered atomic lithium. This is carried out with the addition of an acid or a base at a controlled acidic lithium elution pH, for example pH 3.5 to 7, or a pH 4-5, so as to elute lithium into a liquid lithium eluate and to provide regenerated ferric phosphate solids with a heterosite structure. The regenerated ferric phosphate solids may then be recycled to the lithium extraction step.

The lithium elution step is carried out at a controlled elution solid/liquid ratio of lithium ferrous phosphate solids to the liquid lithium eluate, for example of at least 2%, or up to 65%, and the lithium extraction step and the lithium elution step are carried out in concert so as to provide a desired lithium concentration, for example of at least 20 g/L, or up to 40 g/L, in a concentrated liquid lithium eluate. A portion of the lithium eluate may be recycled to the lithium extraction step, so as to build the lithium concentration in the final concentrated lithium eluate. This recycled portion may for example be up to 90%. In this way, a solution of high lithium concentration is provided so as to avoid the need to further concentrate lithium before purification or precipitation of lithium carbonate.

Impurity removal steps may be carried out to provide a purified lithium chloride solution, for example by removing dissolved calcium and magnesium from the concentrated liquid lithium eluate. This may for example be accomplished by: precipitation of calcium solids and magnesium solids, and one or more steps of impurity-removal solid/liquid separation to separate alkaline earth impurity solids; and/or, ion exchange separation of divalent cations from the liquid lithium eluate. In additional steps of impurity removal, dissolved boron may be removed from the concentrated liquid lithium eluate, for example by exposure to a boron-specific ion exchange resin.

Solid lithium carbonate may be precipitated from the purified lithium chloride solution, for example by addition of an alkali metal carbonate such as sodium carbonate, advantageously with heating, for example to at least 80, 85, 90° C., to produce a solid lithium carbonate product comprising at least 99.5 wt % $Li_2CO_3$. In some implementations of these processes, the solid lithium carbonate product comprises less than 0.02 wt % Cl, less than 0.005 wt % K, less than 0.1 wt % Na, less than 0.01 wt % Mg, less than 0.1 wt % $SO_4$, less than 0.01 wt % Fe, and less than 0.02 wt % Ca.

DETAILED DESCRIPTION

Figure 1:
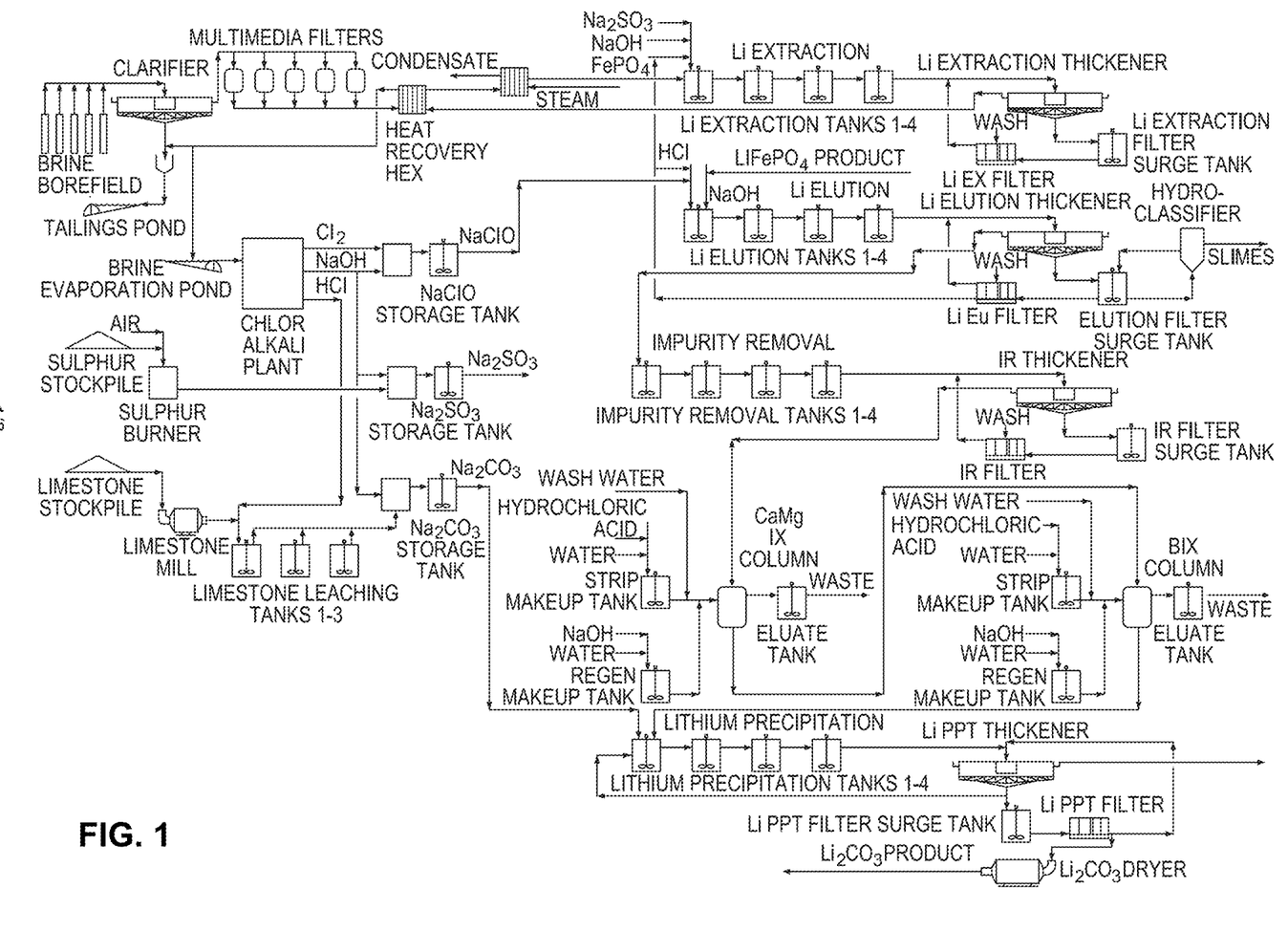
FIG. 1 is a process flow schematic, illustrating various aspects of an exemplary process for selective recovery of lithium from a Na—Mg—Cl—$SO_4$ brine using aqueous redox reactions in Li extraction and Li elution steps that precede impurity removal and lithium precipitation.

FIG. 1 illustrates an exemplary process in which a brine containing lithium is pumped from a series of wells, for example in a salar, to a process plant, where impurities are removed, and the lithium is purified and converted to a lithium carbonate. Reagents used in the concentration and conversion process are recycled and regenerated using a chlor-alkali plant fed by spent brine from the lithium extraction process. The chlor-alkali plant and produces hydrochloric acid (HCl), sodium hypochlorite (NaClO), sodium sulphite ($Na_2SO_3$), sodium thiosulphate ($Na_2S_2O_3$) and sodium hydroxide (NaOH) for use as reagents in the conversion of lithium.

As illustrated, limestone is mined from a deposit and is neutralized with HCl to produce a concentrated carbon dioxide ($CO_2$) stream. The $CO_2$ is reacted with NaOH in carbonation reactors to produce sodium carbonate ($Na_2CO_3$) which is used to precipitate the lithium as a lithium carbonate product.

The illustrated lithium refining process consists of seven process steps:
Raw brine clarification;
Lithium extraction;
Lithium Elution
Impurity Removal;
Lithium conversion;
Limestone reactors and carbon dioxide generation; and
Chlor-alkali plant.

Sources of lithium brines amenable to treatment using processes disclosed herein vary widely, and include continental brines, geothermal brines, oilfield brines and various industrial wastewaters (see Meshram et al., 2014, Ref 46). For example, brines may be sourced from an existing brine treatment plant in which evaporation ponds are used to concentrate the lithium containing brine, in this way providing a pre-concentrated brine for treatment by processes disclosed herein. Similarly, brines may be treated that have been at least partly purified by a prior or preliminary separation process so as to separate at least some salts from the lithium, for example a prior membrane filtration process, an ion exchange process or a solvent extraction process. Brines may be graded in terms of lithium concentration, for example varying between high grades of on the order of 0.3% Li to lower grades on the order of 0.03% Li (300 ppm or 300 mg/L) or even lower. Select embodiments involve the use of processes that are sufficiently selective and thorough to facilitate treatment of lower grade brines, for example brines having ≤0.2 wt % or ≤0.1 wt % or ≤0.05 wt % or ≤0.04 wt % or ≤0.03 wt % Li. In some embodiments, the treated brine may for example be selected to provide a desired concentration range for treatment by a specific process, for example 350-450 ppm or 390-410 ppm. Magnesium may represent a particular challenge in Li recovery, so that brines may be graded in terms of the magnesium/lithium ratio, with challenging relatively high Mg/Li ratios being for example on the order of 8:1. Select embodiments accordingly involve the use of processes that are sufficiently selective and thorough to facilitate treatment of lower grade brines, for example brines having Mg/Li ratio ≥5:1, 6:1, 7:1, 8:1, 9:1 or 10:1.

In the embodiment illustrated in FIG. 1, incoming brine is treated through a clarifier and multimedia filters, to remove suspended solids. In alternative embodiments, clarification may for example be carried out so as to achieve total suspended solids of less than 100, 90, 80, 70, 60, 50, 40, 30, 20 or 10 ppm (the dry-weight of suspended particles, that are not dissolved). The clarified brine may then be heated, for example to a temperature of up to about 45° C., 50° C., 55° C., 60° C. or 65° C. In some embodiments, by a temperature of about 65° C., there may be some undesirable insertion of Na into the adsorbent. Heating may for example take place in a plurality of stages, for example, as illustrated in two stages of heat transfer to achieve the required temperature. In the first illustrated heat recovery stage hot spent brine is passed through a series of heat exchangers to recover some of the contained heat before the brine is pumped to an evaporation or tailings pond. As illustrated, a second stage of heating is then carried out using steam to raise the brine to the required temperature. The hot clarified brine may then be pumped to the lithium extraction stage.

As illustrated, lithium extraction is carried out by treatment of the hot brine in a reactor train comprising four tanks in which the lithium is extracted onto a ferric phosphate solid which is introduced into the reactor feed. As illustrated, a caustic and a reducing agent, such as sodium sulphite or sodium thiosulfate, are introduced into the reactor feed to control the reaction conditions, importantly including the control of the lithium extraction pH. In alternative embodiments, acid or base may be added to control lithium extraction pH, for example in a range of from 4 to 10, and in some embodiments maintaining a desired pH of for example 7. In the illustrated embodiment, the lithium loading reactions are as follows: Sulphite as a reducing agent.

Anodic: $SO_3^{2-}+H_2O \rightarrow SO_4^{2-}+2H^++2e^-$

Cathodic: $Li^++FePO_4+e^- \rightarrow LiFePO_4$

Overall: $2FePO_4+2LiCl+2NaOH+Na_2SO_3 \rightarrow 2LiFePO_4+Na_2SO_4+2NaCl+H_2O$ Thiosulfate as a reducing agent.

Anodic: $2S_2O_3^{2-} \rightarrow S_4O_6^{2-}+2e^-$

Cathodic: $Li^++FePO_4+e^- \rightarrow LiFePO_4$

Overall: $2FePO_4+2LiCl+2Na_2S_2O_3 \rightarrow 2LiFePO_4+Na_2S_4O_6+2NaCl$

As illustrated, the discharge from the last lithium extraction reactor flows under gravity to a thickener where lithium ferrous phosphate solids are recovered. A spent brine stream is discharged from the thickener overflow to be pumped via the heat recovery exchangers to a tailings or chlor-alkali plant evaporation pond.

As illustrated, a lithium-extraction solid/liquid separation is carried out so as to separate the loaded lithium ferrous phosphate solid from a hot spent brine. In the illustrated embodiment, thickener underflow is pumped to a filter feed tank and from there to a filter, such as a plate and frame filter, where the loaded lithium ferrous phosphate solid product is filtered and washed, for example to remove the majority of the soluble impurities present in the remaining brine liquor. Filter washings may be recycled to the thickener feed.

A wide variety of processes may be used to produce iron phosphate materials suitable for selective lithium extraction (see References 47-56), and these may for example be adapted for use in processes disclosed herein to produce $FePO_4/LiFePO_4$ materials having a heterosite/triphylite crystal structure, for example with carbon added in an appropriate amount to enhance conductivity ($Li_xFe^{2+/3+}PO_4C_x$). The nature and behavior of these materials has been very well characterized, described generally as having ordered olivine crystal structure, mediating reversible topotactic Li intercalation (see References 57, 58).

As illustrated, washed lithium ferrous phosphate solids are then eluted in a train of four cascading reactors. This kinetics of elution, as demonstrated in the Examples herein, dictate that the elution reactor train may be much smaller that the lithium extraction reactor train. In the elution step, the lithium ferrous phosphate solids (i.e. LiFePO$_4$, lithium iron (II) phosphate, LiFe$^{2+}$PO$_4$, or triphylite) are exposed to an oxidizing agent under controlled acidic lithium elution conditions, for example at a pH of 3.5-7, or 4-5. As illustrated, this may for example involve using hydrochloric acid and sodium hypochlorite to elute the lithium into the liquid phase and regenerate the ferric phosphate solids. The regenerated ferric phosphate solids may then be recycled to the lithium extraction process. In the illustrated embodiment, the lithium stripping reactions are as follows:

Anodic: LiFePO$_4$→Li$^+$+FePO$_4$+e$^-$

Cathodic: OCl$^-$+2HCl+2e$^-$→3Cl$^-$+H$_2$O

Overall: 2LiFePO$_4$+NaClO+2HCl→2FePO$_4$+2LiCl+ NaCl

In an alternate embodiment, gaseous chlorine may be injected into the liquid phase and be used to elute the lithium into the liquid phase and regenerate the ferric phosphate solids. The regenerated ferric phosphate solids may then be recycled to the lithium extraction process. In this embodiment, which provides synergistic efficiencies when carried out in conjunction with the production of reactants in a chlor-alkali plant, the lithium stripping reactions are as follows:

Anodic: LiFePO$_4$→Li$^+$+FePO$_4$+e$^-$

Cathodic: Cl$_2$+2e$^-$→2Cl$^-$

Overall: 2LiFePO$_4$+Cl$_2$→2FePO$_4$+2LiCl

The lithium elution process may advantageously be carried out at a controlled elution solid/liquid ratio of lithium ferrous phosphate solids to the liquid lithium eluate. This elution solid/liquid ratio may for example be at least 1-65%, or at least 2, 5, 10, 15, 20, 25, 30, 35, 40, 45, 50, 55, 60, 65%. Employing an appropriate elution solid/liquid ratio facilitates the concentration of lithium in the lithium eluate. The lithium extraction step and the lithium elution step may for example carried out in concert so as to provide a lithium concentration of at least 10, 15, 20, 25, 30, 35, 40 or 45 g/L in a concentrated liquid lithium eluate.

In the illustrated embodiment, the last elution reactor overflows under gravity to a lithium elution thickener where the stripped solids are thickened, and the thickener overflow forms a concentrated liquid lithium eluate stream that is passed to further processing. In some embodiments, at least a portion of this eluate stream may be recycled to the lithium elution process, so as to facilitate an increase in the lithium concentration in the lithium eluate. For example, a relatively low elution solid/liquid ratio may be used, such as 5% solids, to produce a given concentration of eluted lithium, with a lithium eluate recycle stream provided to build the lithium ion concentration to the ultimate concentration that is desired. Alternative or additional concentration steps may also be employed, such as membrane systems and/or an evaporation step, for example in an evaporation pond or with multiple effect evaporators (or similar systems), to concentrate the lithium in solution prior to removal of impurities and recovery of the lithium carbonate product.

As illustrated, the elution thickener underflow is pumped to a filter feed surge tank and the solids are washed to recover the remaining lithium from the liquor phase. The washed solids may then be repulped and recycled to the head of the lithium extraction circuit. Filter washings are pumped to the feed of the lithium elution thickener.

An elutriation circuit is provided on a bleed stream of the thickener underflow to allow any fine suspended solids which may have escaped the brine treatment circuit or may have been formed as a reaction product to be removed from the reagent using an up-current classifier to achieve the required separation. The treated solids are returned to the repulp tank.

As shown in FIG. 1, the impurity removal section comprises a series of reactor tanks, a thickener and filters to separate residual impurities, the solid waste, from the concentrated liquid lithium eluate. In the illustrated embodiment, calcium and magnesium are further rejected from the lithium solution by precipitation with sodium hydroxide and sodium carbonate. An aspect of the present process includes the control of lithium extraction and elution conditions so that calcium and magnesium levels are already very low in the concentrated liquid lithium eluate at this point in the circuit. This is facilitated by washing of the extraction solids in a manner that is effective to reject soluble impurities in the wash liquors.

In some embodiments, the impurity solids may be filtered and washed prior to repulping of the filter cake to allow the washed solids to be collected.

Steps are also provided to remove non-alkali elements from the concentrated liquid lithium eluate. Recovery of divalent cations may for example be achieved using an ion exchange resin, such as a macroporous aminophosphonic acid chelating resin (for example Purolite S-950). This may for example be carried out in a plurality of ion exchange columns, for example operating in a lead/lag configuration where the lead column can be taken off line for resin elution and regeneration. In such a system, resin elution is achieved in two stages by taking the lead column off line in sequence to recover the adsorbed metals. Solution feed passes to the next column in line which will then be eluted in sequence when the resin is loaded. A weak acid elution may for example be used to elute the weakly held cations, for example using 100 g/L hydrochloric acid. Stripped resin may then be washed with water to remove residual acid and regenerated, for example with a weak 40 g/L caustic solution. The resin may be washed again before returning to service.

In the illustrated embodiment, boron is extracted from the discharge liquor from the Ca Mg Ion Exchange discharge. In alternative embodiments, this order of impurity removal may be reversed. Boron may for example be recovered using a boron specific resin, such as Amberlite PWA10 or Purolite S108. A plurality of columns may again be used, with the discharge of the Ca Mg ion exchange circuit passing through two or more resin columns arranged in a lead/lag configuration. Again, resin elution may be achieved in two stages by taking the lead column off line in sequence to recover the adsorbed metals. Solution feed passes to the next column in line which will then in sequence be eluted when the resin is fully loaded. A weak acid elution, for example at 100 g/L hydrochloric acid, may again be used to elute the weakly held cations, and the stripped resin washed with water to remove residual acid. The resin is then regenerated, for example with a weak 40 g/L caustic solution and the resin is washed again before returning to service as the last column in series.

A purified lithium chloride solution is produced by the clarification and purification operations, and this purified lithium chloride solution may then be converted to a lithium carbonate product, for example by the addition of sodium carbonate. As illustrated, heating of the process liquor, for example with steam, may be carried out so as to improve precipitation efficiency, for example with heating up to 70, 80, 90 or 95° C. to. The lithium carbonate product may then be dewatered, for example using a centrifuge, optionally washed, then dried and milled for packaging.

In select embodiments, the lithium carbonate may for example comprise $Li_2CO_3$ in a minimum amount of 99.8% by weight of dry substance, CI max. 0.015 wt %, K max. 0.001 wt %, Na max. 0.065 wt %, Mg max. 0.007 wt %, $SO_4$ max. 0.050 wt %, Fe max. 0.001 wt %, Ca max. 0.016 wt %, and $H_2O$ (100° C.) max. 0.35 wt %.

As illustrated in FIG. 1, an optional aspect of the present processes involves the use of a chlor-alkali plant that accepts spent brine from the lithium extraction process as a source of sodium chloride. Conventional and innovative chlor-alkali plants are well known (see Refs 59-62). To facilitate this, a proportion of the spent brine from the hydrometallurgical process steps may be pumped to an evaporation pond in which the sodium chloride concentration may be allowed to increase, for example to saturation. This sodium chloride liquor may then be pumped to the chlor-alkali plant to be used as a feedstock to prepare hydrogen, chlorine and sodium hydroxide. These reagents are then used, as illustrated, to prepare a series of reagents that are used in the recovery of lithium from the brine, as follows.

Hydrogen and chlorine from the chlor-alkali plant may be reacted together to from hydrochloric acid. Sodium hydroxide from the chlor-alkali plant may be reacted with carbon dioxide, for example derived from limestone, to produce sodium carbonate. The chlor-alkali sodium hydroxide product may also be used to produce sodium sulphite, for example by reaction with sulphur dioxide produced by burning sulphur in air. The chlor-alkali sodium hydroxide product may also be used to produce sodium thiosulfate, for example by reaction with sulfur dioxide produced by burning sulphur in air and elemental sulphur. Sodium hydroxide and chlorine from the chlor-alkali plant may be used to prepare sodium hypochlorite, for example in a series of stirred reactors on an as needs basis.

Examples

The exemplified processes were carried out on a brine having the composition set out in Table 1.

TABLE 1

| | Brine concentration | |
|---|---|---|
| Species | Conc. [mol/L] | Salt conc. [g/L] |
| LiCl | 0.0573 | 2.43 |
| NaCl | 4.6529 | 271.93 |
| KCl | 0.1959 | 14.60 |
| $MgCl_2 \cdot 6H_2O$ | 0.1557 | 31.65 |
| $CaCl_2 \cdot 6H_2O$ | 0.0296 | 6.48 |
| $Na_2SO_4$ | 0.0624 | 8.86 |
| $Na_2B_4O_7 \cdot 10H_2O$ | 0.0104 | 3.95 |

Lithium loading and lithium stripping reactions were carried out under the conditions set out in Table 2 and Table 3, with the overall reactions as follows.

Lithiation: $2FePO_4+2LiCl+2Na_2S_2O_3 \rightarrow 2LiFePO_4+Na_2S_4O_6+2NaCl$

Delithiation: $2LiFePO_4+NaClO+H_2O \rightarrow 2FePO_4+LiCl+LiOH+NaOH$

TABLE 2

| | Lithiation (Lithium loading) | | | | | | |
|---|---|---|---|---|---|---|---|
| Test | [FePO4] (g/L) | [Na2S2O3] (g/L) | [FePO4] (mol/L) | [Na2S2O3] (mol/L) | [Na2S2O3]/ [LiFePO4] | T (° C.) | pH |
| 1 | 8.64 | 11.32 | 0.0573 | 0.0716 | 1.25 | 45 | 7 |
| 2 | 8.64 | 11.32 | 0.0573 | 0.0716 | 1.25 | 45 | 7 |

TABLE 3

| | Delithiation (Lithium stripping) | | | | | | |
|---|---|---|---|---|---|---|---|
| Test | [LiFePO4] (g/L) | [NaOCl] (g/L) | [LiFePO4] (mol/L) | [NaOCl] (mol/L) | [NaOCl]/ [LiFePO4] | T (° C.) | pH |
| 1 | 10.00 | 3.539 | 0.0634 | 0.0475 | 0.75 | 25 | 4 |
| 2 | 10.00 | 3.539 | 0.0634 | 0.0475 | 0.75 | 25 | 5 |

Figure 2:
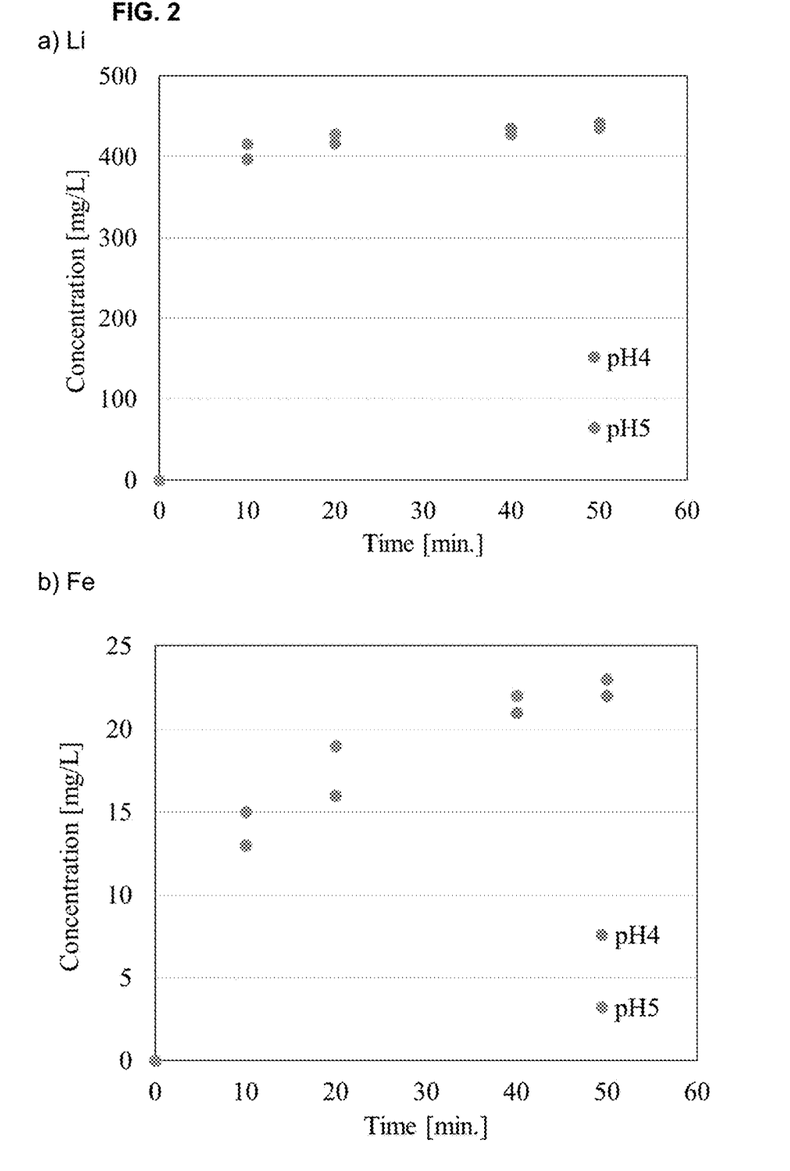
FIG. 2 includes three plots that show the concentrations (mg/L) of a) Li, b) Fe and c) P over time in the exemplified delithiation tests at pH 4 and pH 5.
Figure 3:
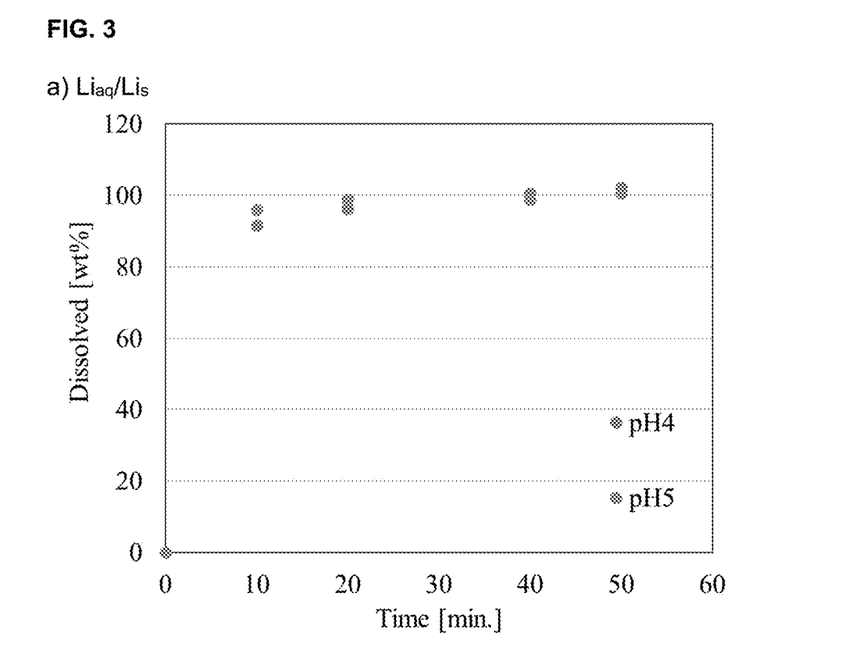
FIG. 3 includes three plots that show the wt % of aqueous/solid species in the exemplified delithiation tests at pH 4 and pH 5, for a) $Li_{aq}/Li_s$, b) $Fe_{aq}/Fe_s$ and c) $P_{aq}/P_s$.

FIG. 2 includes three plots that show the concentrations (mg/L) of a) Li, b) Fe and c) P over time in the delithiation tests at pH 4 and pH 5. FIG. 3 illustrates the same results in terms of wt % of aqueous/solid species for a) $Li_{aq}/Li_s$, b) $Fe_{aq}/Fe_s$ and c) $P_{aq}/P_s$. The results surprisingly illustrate that essentially all of the lithium was eluted almost immediately. Importantly, the results also illustrate the somewhat slower kinetics of Fe and P dissolution, and the surprising fact that Fe and P dissolution was reduced at pH4 compared to pH5. This data establishes that the delithiation process may be carried out at a controlled pH and for a controlled delithiation reaction time, so as to minimise the dissolution of Fe and P from the $LiFePO_4$ matrix. The data in FIG. 3 illustrate that in terms of wt %, conditions may be controlled so that relatively little of the $LiFePO_4$ matrix is dissolved, showing that under the test conditions less than 0.7% of iron, and only 3% of phosphorus, was lost to solution.

Figure 4:
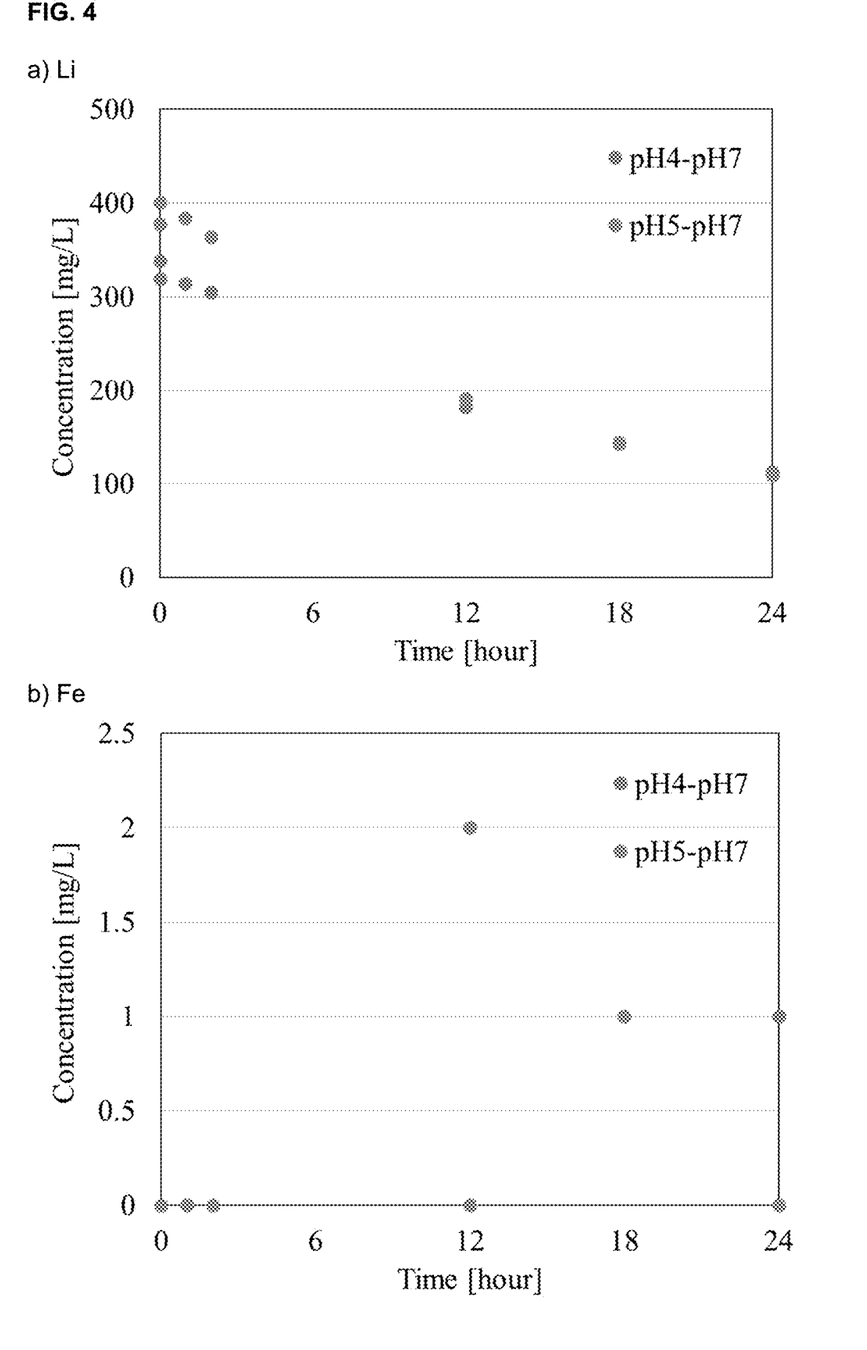
FIG. 4 includes three plots that show the concentrations (mg/L) of a) Li, b) Fe and c) P over time in the exemplified lithiation tests at pH 7, following delithiation at either pH 4 or pH 5.
Figure 5:
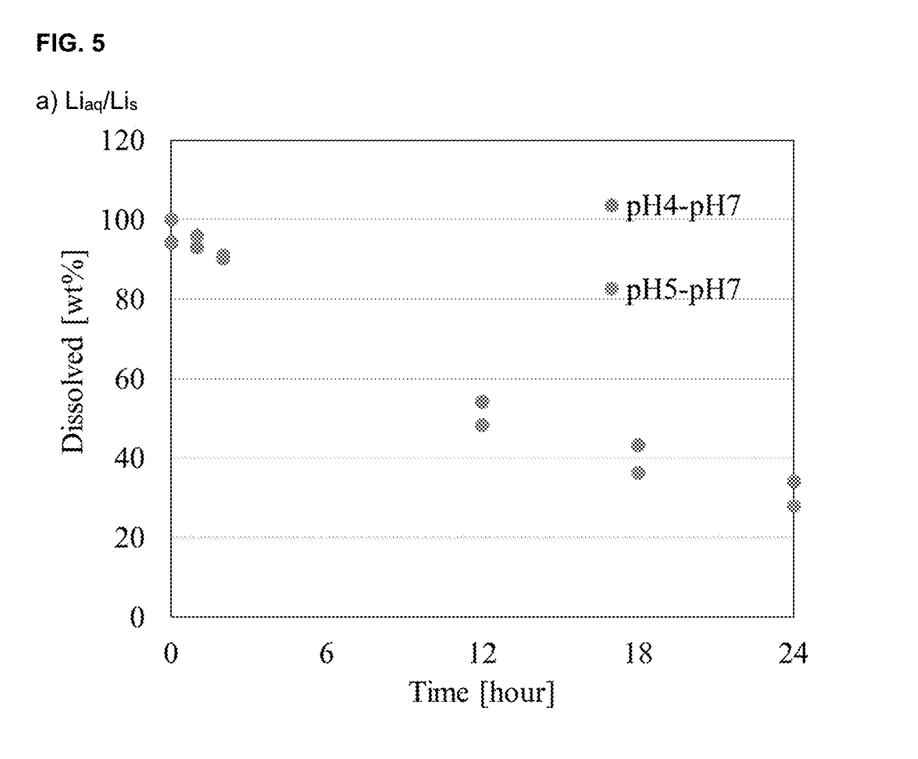
FIG. 5 includes three plots that show the wt % of aqueous/solid species in the exemplified lithiation tests at pH 7, following delithiation at either pH 4 or 5, for a) $Li_{aq}/Li_s$, b) $Fe_{aq}/Fe_s$ and c) $P_{aq}/P_s$.

FIG. 4 includes three plots that show the concentrations (mg/L) of a) Li, b) Fe and c) P over time in the lithiation tests at pH 7, following delithiation at either pH 4 or pH 5. FIG. 5 illustrates the same results in terms of wt % of aqueous/solid species for a) $Li_{aq}/Li_s$, b) $Fe_{aq}/Fe_s$ and c) $P_{aq}/P_s$. As illustrated, lithium concentration in solution decreased from 400 mg/L to 100 mg/L in 24 hours at 45° C., and the dissolution of Fe and P was de minimis. As illustrated in FIG. 5, approximately 70% of the dissolved lithium in the brine was extracted in 24 hours at 45° C., with less than 0.06% of the iron, and only 0.2% of the phosphorus, dissolved. This data confirms that lithiation and delithiation conditions may be controlled so that relatively little of the $FePO_4/LiFePO_4$ matrix is dissolved, provided pH is appropriately controlled. This pH control also facilitates high degrees of selective lithium recovery.

INCORPORATED REFERENCES

| | | |
|---|---|---|
| 1) | U.S. Pat. No. 9,994,930 | Process for producing lithium carbonate from concentrated lithium brine 2018 Jun. 12 |
| 2) | U.S. Pat. No. 5,993,759 | Production of lithium carbonate from brines 1999 Nov. 30 |
| 3) | U.S. Pat. No. 9,255,011 | Method for producing lithium carbonate 2016 Feb. 9 |
| 4) | U.S. Pat. No. 9,169,125 | Method for producing high-purity lithium carbonate 2015 Oct. 27 |
| 5) | U.S. Pat. No. 5,219,550 | Production of low boron lithium carbonate from lithium-containing brine 1993 Jun. 15 |
| 6) | U.S. Pat. No. 6,143,260 | Method for removing magnesium from brine to yield lithium carbonate 2000 Nov. 7 |
| 7) | U.S. Pat. No. 6,048,507 | Process for the purification of lithium carbonate 2000 Apr. 11 |
| 8) | U.S. Pat. No.1 0315926 | Selective lithium recovery as lithium carbonate from natural brines 2019 Jun. 11 |
| 9) | U.S. Pat. No. 8,641,992 | Process for recovering lithium from a brine 2014 Feb. 4 |
| 10) | U.S. Pat. No. 9,255,012 | Method for recovering lithium carbonate 2016 Feb. 9 |
| 11) | U.S. Pat. No. 8,691,169 | Method for the production of battery grade lithium carbonate from natural and industrial brines 2014 Apr. 8 |
| 12) | U.S. Pat. No. 10336624 | Method of producing high-plurality lithium carbonate by controlling particle size, particle size distribution, and particle shape 2019 Jul. 2 |
| 13) | WO2019002653A1 | Method for obtaining concentrated brine of minimum impurity content from brine found in natural salt flats and salt marshes, said method having minimum environmental impact and maximum lithium recovery 2019 Jan. 3 |
| 14) | U.S. Pat. No. 10246341 | Method for producing lithium carbonate from low-lithium brine by separating magnesium and enriching lithium 2019 Apr. 2 |
| 15) | WO2018085915A1 | Method for the production of lithium carbonate from salt brines 2018 May 17 |
| 16) | WO2012099637A1 | Production of high purity lithium compounds directly from lithium containing brines 2012 Jul. 26 |
| 17) | U.S. Pat. No. 20070160516A1 | Production of lithium compounds directly from lithium containing brines 2007 Jul. 12 |
| 18) | WO2017028162A1 | Method for preparing lithium carbonate by quickly concentrating brine 2017 Feb. 23 |
| 19) | U.S. Pat. No. 8,679,428 | Method for preparing high-purity lithium carbonate from brine 2014 Mar. 25 |
| 20) | U.S. Pat. No. 8,920,763 | Method for producing lithium carbonate 2014 Dec. 30 |
| 21) | WO2010105508A1 | Method for extracting lithium salt from low-magnesium/lithium ratio brine of saline with calcium circulation solid-phase conversion process 2010 Sep. 23 |
| 22) | WO2017005113A1 | Method for extracting lithium from salt lake brine 2017 Jan. 12 |
| 23) | EP2855735B1 | Processes for preparing lithium carbonate 2018 Mar. 7 |
| 24) | U.S. Pat. No. 9,598,291 | Method for manufacturing lithium hydroxide and method using same for manufacturing lithium carbonate 2017 Mar. 21 |
| 25) | WO2011133165A1 | A process for making lithium carbonate from lithium chloride 2011 Oct. 27 |
| 26) | WO2018234614A1 | Method of extracting lithium compound(s) 2018 Dec. 27 |
| 27) | WO2014078908A1 | Process for recovering lithium from a brine with reagent regeneration and low cost process for purifying lithium 2014 May 30 |
| 28) | EP2749535A1 | Processes for preparing highly pure lithium carbonate and other highly pure lithium containing compounds 2014 Jul. 2 |
| 29) | U.S. Pat. No. 20030157013A1 | Recovery of lithium carbonate from contaminated lithium bromide 2003 Aug. 21 |
| 30) | WO2016182337A1 | Method for producing lithium hydroxide and lithium carbonate 2016 Nov. 17 |
| 31) | WO2011082444A1 | Process for the production of lithium carbonate 2011 Jul. 14 |
| 32) | WO2018157203A1 | Lithium extraction method 2018 Sep. 7 |
| 33) | WO2014202005A1 | Method and system for quickly extracting lithium carbonate from saline lake water 2014 Dec. 24 |
| 34) | U.S. Pat. No. 6,547,836 | Process for obtaining monohydrated lithium sulfate from natural brines 2003 Apr. 15 |
| 35) | WO2013049952A1 | Lithium-extraction method for obtaining lithium carbonate from a brine or ore and/or clay pretreated in order to be boron-free 2013 Apr. 11 |
| 36) | U.S. Pat. No. 4,723,962 | Process for recovering lithium from salt brines 1988 Feb. 9 |
| 37) | U.S. Pat. No. 9,725,787 | Process and equipment for producing pure lithium-containing solution 2017 Aug. 8 |
| 38) | WO2015096549A1 | Process and apparatus for extracting battery grade lithium from brine 2015 Jul. 2 |
| 39) | WO2015035488A1 | Methods for producing lithium carbonate and sodium borate from calcium-rich and magnesium-rich brine 2015 Mar. 19 |
| 40) | WO2015121684A1 | Sequestration of Lithium 2015 Aug. 20 |
| 41) | WO2010131664A1 | High purity lithium carbonate and method for producing same 2010 Nov. 18 |
| 42) | U.S. Pat. No. 4,124,684 | Continuous production of lithium carbonate 1978 Nov. 7 |
| 43) | U.S. Pat. No. 20180170763A1 | Method for preparing solid lithium salt from lithium solution 2018 Jun. 21 |
| 44) | U.S. Pat. No. 8,795,614 | Method for economical extraction of magnesium, boron and calcium from lithium bearing solution 2014 Aug. 5 |
| 45) | U.S. Pat. No. 20110305624A1 | Method for production of lithium carbonate 2011 Dec. 15 |
| 46) | Meshram, B.D. Pandey, T.R. Mankhand, Extraction of lithium from primary and secondary sources by pre-treatment, leaching and separation: A comprehensive review, Hydrometallurgy, Volume 150, 2014, Pages 192-208. | |
| 47) | U.S. Pat. No. 9,484,574 | Hydrothermal process for the production of $LiFePO_4$ powder 2016 Nov. 1 |
| 48) | U.S. Pat. No. 20090286159A1 | Lithium secondary battery and electrodes for use therein 2009 Nov. 19 |
| 49) | U.S. Pat. No. 5,910,382 | Cathode materials for secondary (rechargeable) lithium batteries 1999 Jun. 08 |
| 50) | U.S. Pat. No. 6,514,640 | Cathode materials for secondary (rechargeable) lithium batteries 2003 Feb. 4 |
| 51) | U.S. Pat. No. 8,617,430 | Amorphous and partially amorphous nanoscale ion storage materials 2013 Dec. 31 |
| 52) | U.S. Pat. No. 9,362,562 | Cathode materials for secondary (rechargeable) lithium batteries 2016 Jun. 7 |
| 53) | U.S. Pat. No. 8,685,566 | Process to induce polymerization of an organic electronically conductive polymer 2014 Apr. 1 |

| | |
|---|---|
| 54) U.S. Pat. No. 20120308896A1 | Positive-electrode material for secondary battery and secondary battery using the same 2012 Dec. 6 |
| 55) Padhi et al., LiFePO4: A Novel Cathode Material for Rechargeable Batteries, K.S. Nanjundaswamy, J.B. Goodenough, Electrochimical Society Meeting Abstracts, 96-1, May, 1996, pp 73. | |
| 56) Padhi et al., Phospho-olivines as positive-electrode materials for rechargeable lithium batteries. Journal of The Electrochemical Society. 144 (4): 1188-1194. | |
| 57) Malik et al., A Critical Review of the Li Insertion Mechanisms in LiFePO$_4$ Electrodes. Journal of The Electrochemical Society, 160 (5) A3179-A3197 (2013). | |
| 58) Yamada et al., Room-temperature miscibility gap in LixFePO4. Nature Materials, vol. 5, p.357 (2006). | |
| 59) WO2014161865A1 | Plant for chlor-alkali electrolysis and a process for using it 2014 Oct. 9 |
| 60) WO2014161866A1 | Chlor-alkali electrolysis plant and a process for using it 2014 Oct. 9 |
| 61) WO2014161868A1 | Plant for chlor-alkali electrolysis of a brine and a process for using it 2014 Oct. 9 |
| 62) WO2014161867A1 | Chlor-alkali electrolysis process 2014 Oct. 9 |

Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range, and numbers are necessarily approximations to the given decimal. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. The invention includes all embodiments and variations substantially as hereinbefore described and with reference to the examples and drawings.

The invention claimed is:

1. A process for extraction of lithium from a brine comprising Li$^+$, Na$^+$, K$^+$, Mg$^{2+}$, Ca$^{2+}$, SO$_4^{2-}$ and a boron salt, the process comprising:
   clarifying and heating the brine to remove suspended solids to provide a heated clarified brine at a temperature of up to about 65° C.;
   in a lithium extraction step, exposing the heated clarified brine to a particulate ferric phosphate solid in the presence of a reducing agent with the addition of an acid or a base at a controlled lithium extraction pH, to extract lithium from the heated clarified brine by reductive topotactic insertion into the particulate ferric phosphate to form a loaded lithium ferrous phosphate solid admixed with a hot spent brine;
   performing a lithium-extraction solid/liquid separation to separate the loaded lithium ferrous phosphate solid from the hot spent brine;
   in a lithium elution step, exposing the lithium ferrous phosphate solid to an oxidizing agent with the addition of an acid or a base at a controlled acidic lithium elution pH to elute lithium into a liquid lithium eluate and to provide regenerated ferric phosphate solids, the lithium elution step being carried out at a controlled elution solid/liquid ratio of the lithium ferrous phosphate solid to the liquid lithium eluate of at least 2%, wherein the lithium extraction step and the lithium elution step are carried out so as to provide a lithium concentration of at least 20 g/L, optionally at least 30 g/L or optionally at least 40 g/L in a concentrated liquid lithium eluate;
   in one or more impurity removal steps, in any order, providing a purified lithium chloride solution by:
      removing dissolved calcium and magnesium from the concentrated liquid lithium eluate, by one or both of:
         precipitation of calcium solids and magnesium solids, and one or more steps of impurity-removal solid/liquid separation to separate alkaline earth impurity solids; and/or,
         ion exchange separation of divalent cations from the liquid lithium eluate; and/or,
      removing dissolved boron from the concentrated liquid lithium eluate by exposure to a boron-specific ion exchange resin;
   precipitating a solid lithium carbonate from the purified lithium chloride solution by addition of an alkali metal carbonate with heating to at least 80° C., optionally at least 85° C., optionally at least 90° C. or above, at atmospheric pressure or above, to produce a solid lithium carbonate product comprising at least 99.5 wt % or optionally at least 99.8 wt % Li$_2$CO$_3$.

2. The process of claim 1, wherein the solid lithium carbonate product comprises less than 0.02 wt % Cl, and/or less than 0.005 wt % K, and/or less than 0.1 wt % Na, and/or less than 0.01 wt % Mg, and/or less than 0.1 wt % SO$_4$, and/or less than 0.01 wt % Fe, and/or less than 0.02 wt % Ca.

3. The process of claim 1, further comprising dewatering and/or washing the solid lithium carbonate product.

4. The process of claim 1, wherein the alkali metal carbonate is sodium carbonate.

5. The process of claim 1, wherein steps of removing dissolved calcium and magnesium are carried out to provide an alkaline-earth-polished liquid lithium eluate and steps of removing dissolved boron are carried out on the alkaline-earth-polished liquid lithium eluate to provide the purified lithium chloride solution.

6. The process of claim 1, wherein the regenerated ferric phosphate solids are recycled to the lithium extraction step.

7. The process of claim 1, wherein a proportion of the liquid lithium eluate is recycled to the lithium extraction step, so as to increase the concentration of lithium in the concentrated liquid lithium eluate.

8. The process of claim 7, wherein the proportion of the liquid lithium eluate that is recycled to the lithium extraction step is at least 50%, optionally at least 60%, optionally at least 70%, optionally at least 80% or optionally at least 90%.

9. The process of claim 1, wherein the controlled elution solid/liquid ratio of the lithium ferrous phosphate solid to the liquid lithium eluate is at least 10, optionally at least 20, optionally at least 30, optionally at least 40, optionally at least 50 or optionally at least 65%.

10. The process of claim 1, wherein the controlled acidic lithium elution pH is 3.5 to 7, or optionally 4 to 5.

11. The process of claim 1, wherein the oxidizing agent comprises $NaClO$, $H_2O_2$, $K_2S_2O_8$, $O_2$, $Cl_2$, $KClO$, $LiClO$, $Na_2S_2O_8$, $Li_2S_2O_8$, or $H_2SO_5$.

12. The process of claim 1, wherein the lithium ferrous phosphate solid comprise lithium iron (II) phosphate ($LiFe^{2+}PO_4$) triphylite.

13. The process of claim 1, further comprising washing the lithium ferrous phosphate solid.

14. The process of claim 1, further comprising recycling hot spent brine to a heat exchanger for heating the brine.

15. The process of claim 1, wherein the controlled lithium extraction pH is from 4 to 10.

16. The process of claim 1, wherein the reducing agent is sodium sulfite, sodium thiosulphate, sodium nitrite, lithium thiosulphate, lithium nitrite, lithium sulphite, sulphur dioxide, potassium thiosulphate, potassium nitrite or potassium sulphite.

17. The process of claim 1, wherein the ferric phosphate solid comprises iron (III) phosphate ($Fe^{3+}PO_4$) heterosite.

18. The process of claim 1, wherein the ferric phosphate solid comprises conductive carbon.

19. The process of claim 1, wherein the particulate ferric phosphate solid has an average size of <100 micron.

20. The process of claim 1, wherein clarifying and heating the brine is carried out so as to reduce total suspended solids to less than 100 ppm.

21. The process of claim 1, wherein the brine comprises less than 0.05 wt % $Li^+$.

22. The process of claim 1, wherein the lithium concentration in the brine is less than 0.1 mol/L; and/or, the sodium concentration in the brine is at least 3 mol/L; and/or, the potassium concentration in the brine is at least 0.1 mol/L; and/or, the magnesium concentration in the brine is at least 0.1 mol/L; and/or, the calcium concentration in the brine is at least 0.01 mol/L; and/or, the boron concentration in the brine is at least 0.005 mol/L.

23. The process of claim 1, wherein the brine has a Mg/Li ratio of ≥5:1, optionally ≥6:1, optionally ≥7:1, optionally ≥8:1, optionally ≥9:1 or optionally ≥10:1.

24. The process of claim 1, wherein a portion of the spent brine is directed to a chlor-alkali plant, optionally wherein a portion of the spent brine is directed to an evaporation pond to concentrate NaCl prior to directing concentrated spent brine to the chlor-alkali plant, and optionally wherein Ca and/or Mg are removed from a portion of the spent brine prior to directing the spent brine to the chlor-alkali plant.

25. The process of claim 24, wherein the chlor-alkali plant generates $Cl_2$ and NaOH that is then reacted to produce the oxidizing agent, optionally wherein $Cl_2$ generated by the chlor-alkali plant is the oxidizing agent.

26. The process of claim 24, wherein the chlor-alkali plant generates HCl that is then reacted with limestone to produce a carbon dioxide, and the carbon dioxide is reacted with NaOH from the chlor-alkali plant to produce sodium carbonate, and the sodium carbonate is used as the alkali metal carbonate.

* * * * *